United States Patent [19]
Dallmeyer et al.

[11] Patent Number: 5,387,396
[45] Date of Patent: Feb. 7, 1995

[54] REACTOR FOR CARRYING OUT EXOTHERMIC REACTIONS

[75] Inventors: Hermann Dallmeyer, Odenthal; Harald Stein, Schmallenberg, both of Germany

[73] Assignee: Bayer Aktiengesellschaft, Leverkusen, Germany

[21] Appl. No.: 704,575

[22] Filed: May 22, 1991

Related U.S. Application Data

[62] Division of Ser. No. 106,077, Oct. 7, 1987, abandoned.

[30] Foreign Application Priority Data

Oct. 16, 1986 [DE] Germany ............................. 3635217

[51] Int. Cl.⁶ ........................... G05D 9/00; F28D 7/00
[52] U.S. Cl. ..................................... 422/106; 122/21; 122/181; 422/200; 422/225
[58] Field of Search ............. 122/21, 318, 319, 320, 122/133, 181; 165/104.21; 422/201, 106, 225, 226, 200

[56] References Cited

U.S. PATENT DOCUMENTS

| | | | |
|---|---|---|---|
| 272,692 | 2/1883 | Hopkins et al. | 122/181 |
| 1,052,626 | 2/1913 | Stoll | 422/225 |
| 3,008,809 | 11/1961 | Martinez | 422/106 |
| 3,085,626 | 4/1963 | Bognar et al. | 165/11 |
| 3,243,268 | 3/1966 | Handlos et al. | 23/309 |
| 3,655,172 | 4/1972 | Ingels | 422/106 |
| 4,882,283 | 11/1989 | Gentry | 422/225 |

FOREIGN PATENT DOCUMENTS 952435 10/1956 Germany .
144614 10/1921 United Kingdom .

*Primary Examiner*—Peter Kratz
*Attorney, Agent, or Firm*—Joseph C. Gil

[57] ABSTRACT

With a view to improving the heat transfer in exothermic reactions and simplifying the construction of the cooling system of the reactor, in particular a stirrer reactor, vertical boiling tubes which are sealed at the bottom are provided, above which is arranged a condensate collecting and liquid distributing chamber in which a sufficient layer of cooling liquid is constantly maintained by means of a liquid level regulator. Cooling fluid and the vapor produced flow in direct contact with each other as they are carried in counter current through the boiling tubes which have only single walls. The vapor passes through the layer of cooling fluid and is continuously discharged and preferably recovered. The condensate is preferably returned to the cooling system.

4 Claims, 1 Drawing Sheet

REACTOR FOR CARRYING OUT EXOTHERMIC REACTIONS

This application is a division, of application Ser. No. 07/106,077 filed Oct. 7, 1987, now abandoned.

BACKGROUND OF THE INVENTION

The present invention relates to a process for cooling during exothermic reactions, and in particular in a stirrer reactor. Cooling fluid is constantly supplied from above into vertical boiling tubes which are closed at the bottom. The vapor produced is removed upwardly in counter current to the cooling fluid. The invention also relates to a reactor, and in particular a stirrer reactor, for carrying out exothermic reactions.

In a known reactor of this type (German Patent 952,435), the boiling tube is a so called "Field tube" i.e. it has a double wall. The cooling, fluid is carried down through the inner tube which is open at both ends while the vapor produced is drawn off between the two tubes and is condensed in a condensation chamber which is separated from the reaction chamber by a partition.

This reactor and the cooling process employed in it are only suitable for removing small quantities heat produced since the degree of heat exchange is not of great. The fact that the cooling tubes are double walled involves considerable constructional complication since the inner tubes must be supported by the outer tubes.

It is also known (British Patent 144,614), to control the temperature of chemical reactions by connecting vertical tubes partly filled with mercury to a collecting pipe. The mercury is evaporated by the heat evolved in the chemical reaction and the vapors are deposited in the upper, filled part of the tubes. The cooling circuit thus takes place inside the tubes. The vapors must not even reach as far as the transverse collecting pipe as this would involve the risk of the cooling tubes being unevenly filled and the only slightly filled tubes would burn through. For removing considerable quantities of heat, the tubes would have to be very long, which would adversely affect their stability.

The problem arises of finding a cooling process and a reactor which would provide a high rate of heat transfer and which would have a more simply constructed cooling system.

DESCRIPTION OF THE INVENTION

Figure 1:
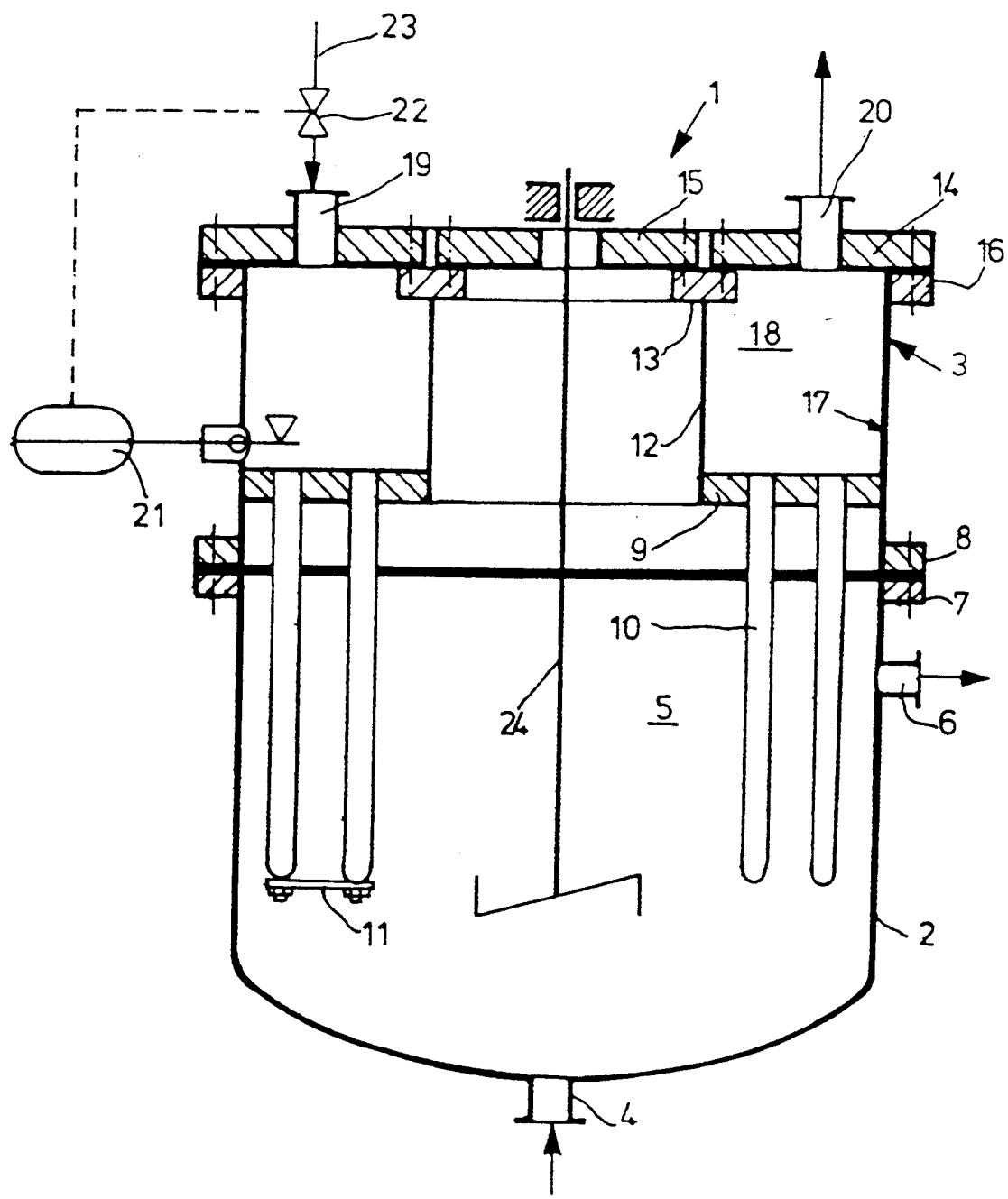
FIG. 1 shows one embodiment of the present invention.

The above problem is solved by the combination of the following features:
a) the vapor makes direct counter current contact with the cooling fluid with which it flows inside the boiling tubes,
b) the openings of the boiling tubes are constantly flooded by cooling fluid, and
c) the vapor leaving the boiling tubes is constantly removed in its passage through the overflowing cooling fluid.

Large quantities of heat can thus be removed per unit time, and all the boiling tubes are constantly supplied with sufficient cooling fluid. The temperature gradient in the wall of the boiling tubes may be kept very low, e.g., about 10° C. The uniformity of heat transfer thereby achieved in every part of the boiling tubes ensures a long service life for the tubes. It has surprisingly been found that the fact that the vapor must pass through the layer of cooling fluid situated above the openings of the boiling tubes is not a disadvantage. The cooling fluid may, of course, be put under excess pressure or reduced pressure.

The heat stored in the vapor is preferably recovered. Such utilization of energy of the vapor renders the process particularly economical.

It is advantageous that the condensate resulting from the recovery of heat can be returned to the boiling tubes as cooling fluids.

Both the recovery of heat and such a cooling circuit are known per se and serve as economic advantages.

If water is used as cooling fluid, as is most common, the velocity of the vapor leaving the boiling tubes is advantageously from 0.2 to 15 m/s, and preferably from 0.2 to 8 m/s. Trouble free cooling may be expected in this process if the vapor velocities are kept within this range. However, organic solvents boiling at temperatures of from 40° to 250° C. at normal pressure, for example, may also be used. The volume of the reaction chamber and the pressure of the vapor produced are immaterial. The volume of the reaction chamber is normally from 2 to 100 m$^3$ and a vapor with an excess pressure of from 0 to 30 bar is produced.

The novel reactor, in particular a stirrer reactor, for carrying out exothermic reactions comprises a closed container having (i) a horizontal partition in which downwardly projecting boiling tubes closed at their bottom ends are fixed, and ii) a reaction chamber equipped with inlet and outlet situated underneath this partition, and (iii) a condensate collecting chamber arranged above the partition.

The keys to the present invention are the following:
a) the boiling tubes have a single wall,
b) the condensate collecting chamber is designed to serve at the same time as distributing chamber for cooling fluid, into which chamber
c) an inlet for cooling fluid opens and from which
d) a vapor tube leads off, and
e) a filling level regulator acting on a valve in the inlet tube is associated with the distributor chamber for cooling fluid.

The single wall of the boiling tubes simplifies the construction of the cooling part of the reactor and increases the cooling effect. The construction of the condensate collecting chamber as a distributing chamber for cooling fluid has the advantage that droplets of liquid carried along by the vapor are directly returned to the boiling tubes. The continuous supply of cooling fluid through an inlet tube and removal of the vapor through a vapor discharge tube enables the valve in the inlet tube to be operated by means of the filling level regulator so that a sufficient layer of cooling fluid is constantly maintained above the boiling tubes.

The ratio of cooling surface of the boiling tubes to the volume of the reaction chamber is preferably from 40 to 400 m$^2$ per m$^3$. A high degree of heat transfer without damage to the boiling tubes is ensured within the range of ratios.

The distributing chamber for cooling fluid is preferably annular with a stirrer arranged in the central axis of the container.

Good flow conditions inside the reaction chamber are obtained by the central arrangement of the stirrer mechanism and the annular arrangement of the boiling tubes round the stirrer so that heat transfer and the removal of heat are promoted.

According to one particularly advantageous embodiment, the container has a lid which is sub-divided into a concentric part and a central part, the outer of these two parts covering the annular distributing chamber for cooling fluid while the stirrer is attached to the inner lid.

The nature of the exothermic chemical reaction in the reaction chamber is immaterial. The novel reactor is suitable in particular for the hydrogenation of aromatic amines with a suspended, solid hydrogenation catalyst. Containers having from 200 to 10,000 boiling tubes may be used.

Referring to the figure, the stirrer reactor consists of a container 1 which is sub-divided into a lower part 2 and an attachment 3. An inlet pipe 4 opening into the lower part 2 of the container from below is provided for introducing the substances which are to undergo reaction. The reaction chamber, which e.g., has a volumetric capacity of 11.2 m$^3$, is indicated by the reference numeral 5. An outlet 6 for the reaction product is situated at about two thirds of the height of the reaction chamber 5. The upper edge of the lower part 2 of the container has a flange 7 which is screwed to a lower flange 8 on the attachment 3. An annular partition 9 is welded into this attachment 3. Boiling tubes 10 are welded into this partition 9 and extend into the reaction chamber 5 which has only a single wall. These boiling tubes may have an external diameter of 25 mm and a wall thickness of 3 mm. At their, lower closed ends, they are stabilized in position by connecting straps 11. A wall 12 extends vertically upwards from the internal edge of the partition 9 and ends in an annular flange 13. The concentric lids 14, 15 are screwed to this annular flange 13, and the outer lid 14 is in addition fixed to a flange 16 of the attachment 3.

The partition 9, the Wall 12, the lid 14 and the wall 17 of the attachment 3 thus together form an annular distributing and condensate separating chamber 18. This distributing and condensate separating chamber 18 has an inlet 19 for the cooling fluid and a discharge 20 for the vapor produced. In addition, a filling level regulator 21 is provided, which acts on a locking device 22 in the indicated inflow pipe 23. A stirrer 24 is mounted centrally on the lid 15.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reactor for carrying out exothermic reactions comprising a closed container having:
    i) a partition in which downwardly projecting, single wall, boiling tubes closed at their lower end are fixed,
    ii) a reaction chamber situated underneath said partition, said reaction chamber having a) an inlet opening for introduction of substances which are to undergo reaction and b) an outlet opening for removal of reaction product,
    iii) a distributing and condensate collecting chamber situated above said partition, said chamber acting to distribute cooling fluid over said partition while at the same time collecting condensate,
    iv) an inlet tube for introducing cooling fluid into said distributing and condensate collecting chamber, said inlet tube opening into said distributing and condensate collecting chamber,
    v) an outlet tube for removing vapor from said distributing and condensate collecting chamber, said outlet tube opening into said distributing and condensate collecting chamber,
    vi) a valve arranged in said inlet tube, and
    vii) a filling level regulator associated with said distributing and condensate collecting chamber, said regulator acting on said valve.

2. The reactor of claim 1, wherein the ratio of the cooling surface of said boiling tubes to the volume of said reaction chamber is from 40 to 400 m$^2$/m$^3$.

3. The reactor of claim 1, wherein said distributing and condensate collecting chamber is annular and a stirrer is arranged in the central axis of said container.

4. The reactor of claim 1, wherein said container is provided with a lid which is sub-divided into a concentric outer lid and a central inner lid, said outer lid covering said distributing and condensate collecting chamber and wherein a stirrer is mounted on said inner lid.

* * * * *